United States Patent
Gracia et al.

[15] 3,644,186
[45] Feb. 22, 1972

[54] PROCESS FOR IRRADIATING SYNTHETIC RUBBER TO IMPROVE GREEN STRENGTH

[72] Inventors: Albert J. Gracia; Patrick J. Reilly, both of Akron; Sandra J. Walters, Cuyahoga Falls, all of Ohio

[73] Assignee: The Goodyear Tire & Rubber Company, Akron, Ohio

[22] Filed: June 27, 1968

[21] Appl. No.: 740,459

[52] U.S. Cl. .................................204/159.2, 260/94.7 R
[51] Int. Cl. ......................C08l 1/00, C08d 5/00, C08f 1/88
[58] Field of Search ....................204/160.1, 159.2; 260/94.7

[56] References Cited

OTHER PUBLICATIONS

Chapiro, Radiation Chemistry of Polymene Systems, Wiley & Sons, (1962) pp. 452– 460.

Pike et al., Jrnl. of Polymer Science, Vol. IX, No. 3 pp. 224– 232 & 244– 249.

*Primary Examiner*—Samuel H. Blech
*Assistant Examiner*—Richard B. Turer
*Attorney*—F. W. Brunner and Richard H. Haas

[57] ABSTRACT

The green strength of synthetic cis-1,4 polyisoprene is increased to levels equivalent to those of natural rubber by irradiating the polyisoprene with 0.1–6.0 Mrads.

5 Claims, No Drawings

PROCESS FOR IRRADIATING SYNTHETIC RUBBER TO IMPROVE GREEN STRENGTH

This invention relates to the physical strength characteristics of unvulcanized rubber compounds. More specifically, it relates to the improvement in the green strength of compounded unvulcanized synthetic and natural polyisoprene rubbers.

Synthetic elastomers have to a major extent supplemented or replaced natural rubber in the fabrication of tires and many other rubber products. More recently stereo-specific polymers, and particularly cis-1,4 polyisoprene have demonstrated a capability of becoming a complete replacement for natural rubber. One impediment to such complete substitution for natural rubber by synthetic cis-1,4 polyisoprene throughout all types and sizes of tires has been the lack of sufficient green strength and tack for satisfactory building properties in large tires such as those employed by trucks, large earth-moving equipment, etc. The ability to minimize or eliminate this difference between natural rubber and cis-1,4 polyisoprene would materially facilitate its complete substitution for natural rubber.

Green strength is a term commonly employed and well understood by persons in the rubber industry. It is, however, a property difficult to define precisely. Basically it is that property of a polymer, most obvious in natural rubber, which contributes to proper building conditions where multiple components are employed and which results in little or no release or relative movement of the assembled components subsequent to assembly and prior to completion of the curing operation. "Tack" is also an important property in the building characteristics of a composite rubber product, but lack of tack can usually be overcome to a large extent by the addition of known tackifying agents. Consequently, any difference in tack between cis-1,4 polyisoprene and natural rubber is ordinarily readily correctable. There has heretofore been a paucity of suitable means for adjusting green strength which would correspond to the use of tackifiers in adjusting tack. Lack of suitable green strength in composite rubber products consisting solely or largely of synthetic polyisoprene has been a significant problem in the rubber industry since the advent of synthetic cis-1,4 polyisoprene ("synthetic natural rubber").

The Instron green strength test is one measure of the stress/strain properties of unvulcanized compounds. It has been accepted by many as the best indication of the ability of a compound to resist deformation in the uncured state. Typical stress/strain curves are associated with each elastomer although the magnitude of the curve for a given elastomer will vary depending upon the compounding formulation employed, i.e., depending upon the amount of carbon black, oil, etc., which is added to the elastomer gum stock. However, when employing the same, or even a substantially similar, compound formulation, if the shape and magnitude of the stress/strain curves of two elastomers are comparable, the elastomers will possess equivalent building and handling characteristics.

The normal stress/strain curve of raw polymers or unvulcanized compounds shows a definite inflection (yield point) in the stress at relatively low strain. After this initial stress inflection is passed, continued elongation may cause the stress to (1) continue to increase at a different rate, (2) stay nearly constant, or (3) continually fall until rupture of the specimen occurs. Which of the three phenomena occurs is dependent on the type polymer, the amount and nature of the other compounding ingredients in the recipe and the amount and nature of mastication.

It has been found that the performance of a green compound in an unvulcanized tire can be predicted by three points of the stress/strain curve; (1) the first peak, or inflection, of the stress, (2) the ultimate or breaking tensile, (3) the percent ultimate elongation. Improvements in one or more of the stress properties indicate improved green strength.

Applicants have now discovered a process for improving the green strength of synthetic cis-1,4 polyisoprene which comprises irradiating synthetic cis-1,4 polyisoprene and subsequently masticating the irradiated polymer.

The synthetic cis-1,4 polyisoprene may be any such polyisoprene regardless of the catalyst system employed in its polymerization. The invention, however, is especially useful when employed with the "high" cis-1,4 polyisoprene formed when a catalyst system such as an Al-Ti or a Li based system is employed. The Al-Ti system consists of an aluminum alkyl compound (such as an aluminum trialkyl or an aluminum trialkyl complex formed from the reaction of an aluminum trialkyl and an aromatic ether such as diphenyl ether or anisole) in mixture with a transition metal halide (such as titanium tetrachloride) at about equal mole ratios or slightly less of the aluminum to the titanium. The Li based catalyst comprises a lithium compound such as finely divided lithium metal employed as the catalyst or, more conveniently, a more soluble form of lithium such as a lithium alkyl. The "high" cis-1,4 polyisoprene produced has a cis-1,4 content (generally in excess of 90 percent) very close to that of natural rubber and, with the exception of a somewhat reduced green strength, does in fact closely approximate natural rubber.

The gum stock to be irradiated may be in a solid (bulk) state or may be a cement. If the latter, any conventional solvent may be employed and the solids content, while not critical, will normally be in the range of 10–20 percent.

The irradiation source may be an electron accelerator or an isotope source such as gamma radiation from $Co^{60}$. Where electron accelerators are employed, the polymer must be presented in a thin layer because of the well known relatively low penetration as compared to that produced by an isotope source.

The irradiation dose rate should be in the range between 0.01 and 1,000 Mrads/hour and preferably between 0.01 and 10 Mrads/hr.

The irradiation dose should be in the range between 0.1 and 6.0 Mrads and preferably between 0.5 and 3.0 Mrads. When the dose is increased beyond 3.0 Mrads, the physical properties are affected so that the processing of the polymer becomes difficult. With dosages in excess of 6.0 Mrads the polymer frequently has unacceptable processing characteristics for some purposes.

Mastication is accomplished on any conventional equipment suitable for that purpose and in the normal manner well known to those skilled in the art. However, mastication is necessary to achieve the benefit of the invention. Irradiated gum stocks show little difference in green strength, as determined by the Instron test, until after mastication.

EXAMPLES

The following examples are set forth to illustrate the invention:

The samples (solid or cement) were irradiated by using a $Co^{60}$ source at a dose rate of 0.1 Mrad/hour. Samples were masticated eight minutes at 225° F. and 50 r.p.m. in a Brabender Plastograph. All tensile values shown are after mastication, and were obtained by pulling ⅛ inch dumbbells at 10 inches/minute on a conventional Instron testing machine.

Blends were prepared by loading precalculated amounts of the two substituents into the Brabender chamber and masticating eight minutes at 225° F. and 50 r.p.m.

Table I shows the after mastication effect of various irradiation doses on both solid and cement samples.

Table II shows the effect of blending irradiated and nonirradiated samples.

Table III shows the effect of mastication on preirradiated samples.

TABLE II

Masticated blends of irradiated and non-irradiated synthetic cis-1,4 polyisoprene

| Dose to irradiated portion (Mrad.) | Blended ratio (irradiated to non-irradiated rubber) | "Average" dose [1] of blend (Mrad.) | Yield point (p.s.i.) | Ultimate P.s.i. | Ultimate percent elong. | DSV | Gel, percent |
|---|---|---|---|---|---|---|---|
| 2.0 | 1:1 | 1.0 | 23 | 28 | 1,900 | 2.9 | 4 |
| 3.0 | 1:2 | 1.0 | 23 | 38 | 1,800 | 2.8 | 10 |
| 6.0 | 1:5 | 1.0 | 26 | 32 | 1,200 | 2.7 | 9 |
| 3.0 | 1:1 | 1.5 | 23 | 43 | 1,200 | 2.6 | 11 |
| 6.0 | 1:2 | 2.0 | 24 | 51 | 1,100 | 2.6 | 13 |

[1] The average radiation dose was calculated from the weight percentage of irradiated rubber in the blend.

TABLE III

Irradiated cis-1,4 polyisoprene before and after mastication

| Polymer state during irradiation | Radiation dose [1] (Mrad.) | Unmasticated Instron tensiles Yield point (p.s.i.) | Unmasticated Break P.s.i. | Unmasticated Break Percent elong. | Masticated Instron tensiles Yield point (p.s.i.) | Masticated Break P.s.i. | Masticated Break Percent elong. |
|---|---|---|---|---|---|---|---|
| Cement | None | 42 | 50 | 1,600 | 27 | 8 | 2,000 |
|  | 0.4 | 43 | 56 | 1,900 | 27 | 49 | 1,100 |
|  | 0.7 | 43 | 74 | 600 | 26 | 57 | 900 |
|  | 1.0 | 39 | 56 | 400 | 26 | 62 | 800 |
|  | 2.0 | 36 | 53 | 250 | 26 | 80 | 400 |
| Solid | None | 44 | 72 | 1,500 | 26 | 8 | 2,500 |
|  | 0.4 | 45 | 77 | 650 | 26 | 11 | 2,500 |
|  | 0.7 | 45 | 72 | 800 | 26 | 15 | 2,300 |
|  | 1.0 | 44 | 66 | 400 | 24 | 22 | 2,200 |
|  | 2.0 | 38 | 48 | 500 | 23 | 49 | 1,600 |

[1] Doses based on total cement. In terms of solid rubber it would be 5-6 times the given value.

TABLE I

Instron Tensile Data for Irradiated Masticated Synthetic Cis-1,4 Polyisoprene Gum Stocks

| Polymer State During Irradiation | Radiation Dose (Mrads) | Yield Point (p.s.i.) | Instron Tensile Break (p.s.i.) | Instron Tensile C% Elong |
|---|---|---|---|---|
| Solid (1) | None | 22 | 9 | 2,500 |
|  | 0.5 | 22 | 22 | 1,600 |
|  | 0.75 | 22 | 23 | 2,600 |
|  | 1.0 | 25 | 28 | 1,700 |
|  | 1.25 | 22 | 29 | 2,000 |
|  | 1.75 | 27 | 58 | 1,400 |
|  | 2.0 | 32 | 56 | 600 |
|  | 2.5 | 32 | 88 | 900 |
|  | 3.0 | — | 78 | 500 |
|  | 6.0 | — | 91 | 500 |
|  | 12.0 | — | 72 | 400 |
|  | 20.0 | — | 65 | 300 |
| Cement (2) | None | 29 | 18 | 1,500 |
|  | 0.2 | 27 | 28 | 1,600 |
|  | 0.4 | 28 | 44 | 1,100 |

(1) The control had a 5.0 DSV and 13% gel unmasticated; a 3.5 DSV and 7 percent gel after mastication. The irradiated samples were used for the blends shown in Table II.

(2) Doses based on total cement. In terms of solid rubber it would be 5-6 times the given value. The control had a 3.5 DSV and 12 percent gel unmasticated; a 2.8 DSV and 4 percent gel after mastication.

Applicants' process is useful in producing synthetic cis-1,4 polyisoprene which more closely approximates natural rubber. The products resulting from use of the process may be employed in any of the well known uses of natural rubber.

While certain representative embodiments and details have been shown for the purpose of illustrating the invention, it will be apparent to those skilled in the art that various changes and modifications may be made therein without departing from the spirit or scope of the invention.

What is claimed is:
1. The process of (1) irradiating synthetic cis-1,4 polyisoprene containing at least 90 percent cis-1,4 content with a dose of between 0.1 and 6.0 Mrads and (2) masticating the irradiated polymer in any conventional manner.

2. The process according to claim 1 wherein the polyisoprene is formed by using an Al-Ti catalyst system.

3. The process according to claim 1 wherein the dose is between 0.5 and 3.0 Mrads.

4. The process according to claim 1 wherein the average dose of a blended polymer consisting of between 1:5 and 1:0 parts by weight of irradiated and nonirradiated synthetic cis-1,4 polyisoprene is between 0.5 and 3.0 Mrads.

5. The process of claim 1 wherein the polyisoprene contains at least 90 percent cis-1,4 addition, the dose is between 0.5 and 3.0 Mrads, the dose rate is between 0.01 and 10.0 Mrads/hour, and the irradiation source is an isotope.

* * * * *